(12) United States Patent
Kim et al.

(10) Patent No.: US 9,702,756 B2
(45) Date of Patent: Jul. 11, 2017

(54) DISPLAY APPARATUS

(71) Applicant: SAMSUNG ELECTRONICS CO., LTD., Suwon-si (KR)

(72) Inventors: Jong-hyuk Kim, Seoul (KR); Jeong-geun Kim, Osan-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 275 days.

(21) Appl. No.: 14/314,669

(22) Filed: Jun. 25, 2014

(65) Prior Publication Data

US 2015/0028206 A1     Jan. 29, 2015

(30) Foreign Application Priority Data

Jul. 29, 2013   (KR) ................ 10-2013-0089368

(51) Int. Cl.
| | |
|---|---|
| *H04B 10/60* | (2013.01) |
| *G01J 1/42* | (2006.01) |
| *G02B 6/42* | (2006.01) |
| *G09G 3/20* | (2006.01) |
| *H04B 10/114* | (2013.01) |
| *G02B 6/32* | (2006.01) |
| *G02B 6/36* | (2006.01) |

(52) U.S. Cl.
CPC .............. *G01J 1/42* (2013.01); *G02B 6/4206* (2013.01); *G09G 3/2092* (2013.01); *H04B 10/114* (2013.01); *G02B 6/32* (2013.01); *G02B 6/3624* (2013.01); *G09G 2320/08* (2013.01)

(58) Field of Classification Search
CPC ........ G02B 6/32; G02B 6/3624; H04B 10/06; H04B 10/114; H04B 10/60; G09G 3/2092; G01J 1/42

USPC ................ 398/130, 140, 141, 143, 144, 164
See application file for complete search history.

(56) References Cited

U.S. PATENT DOCUMENTS 5,036,188 A * 7/1991 Keitoku ................ H04B 10/60
                                                    250/216
5,987,205 A * 11/1999 Moseley ............. H04B 10/114
                                                    385/125

(Continued)

FOREIGN PATENT DOCUMENTS

| | | |
|---|---|---|
| FR | 2 651 395 A1 | 3/1991 |
| JP | 63-181085 U | 11/1988 |

(Continued)

OTHER PUBLICATIONS

Machine Translation JP 2008-078896.*

(Continued)

*Primary Examiner* — Yara B Green
(74) *Attorney, Agent, or Firm* — Sughrue Mion, PLLC

(57) ABSTRACT

A display apparatus including an optical component and an optical fiber component is provided. The display may include an optical component including a sensor, and an optical fiber component configured to transmit the electromagnetic transmission being incident on a front frame, to the sensor. A display apparatus may transmit light being incident from the outside to a sensor of an optical unit through an optical fiber unit, and transmits light being outputted from the sensor of the optical unit to the outside through the optical fiber unit.

33 Claims, 16 Drawing Sheets

(56) References Cited

U.S. PATENT DOCUMENTS

| | | | | |
|---|---|---|---|---|
| 7,687,778 | B2* | 3/2010 | Wang | G08C 23/04 |
| | | | | 250/353 |
| 2003/0175038 | A1* | 9/2003 | Maeda | G02B 6/4202 |
| | | | | 398/202 |
| 2008/0219672 | A1* | 9/2008 | Tam | H03K 17/9631 |
| | | | | 398/130 |
| 2009/0166537 | A1 | 7/2009 | Fukui et al. | |
| 2010/0061682 | A1* | 3/2010 | Tsai | G02B 6/4292 |
| | | | | 385/81 |
| 2011/0116647 | A1* | 5/2011 | Terlizzi | G10K 11/1788 |
| | | | | 381/71.6 |
| 2013/0155643 | A1* | 6/2013 | Meyer | G02B 6/0008 |
| | | | | 362/2 |
| 2014/0126242 | A1* | 5/2014 | Chen | F21S 11/002 |
| | | | | 362/610 |

FOREIGN PATENT DOCUMENTS

| | | | |
|---|---|---|---|
| JP | 2001-95071 A | | 4/2001 |
| JP | 2005-73132 A | | 3/2005 |
| JP | 2006-86721 A | | 3/2006 |
| JP | 2007-184773 A | | 7/2007 |
| JP | 2008-078896 | * | 5/2008 |
| JP | 200965406 A | | 3/2009 |

OTHER PUBLICATIONS

Communication dated Jan. 8, 2015 issued by the European Patent Office in counterpart European Patent Application No. 14178997.4.
Communication dated May 2, 2017, from the European Patent Office in counterpart European Application No. 14178997.4.

* cited by examiner

DISPLAY APPARATUS

CROSS-REFERENCE TO RELATED APPLICATION

This application claims priority from Korean Patent Application No. 10-2013-0089368 filed in the Korean Intellectual Property Office on Jul. 29, 2013, the disclosure of which is incorporated herein by reference in its entirety.

BACKGROUND

1. Field

Systems, methods, and apparatuses consistent with exemplary embodiments relate to a display apparatus, and more particularly, to a display apparatus having an optical fiber unit configured to transmit light received from the outside or the inside of the display apparatus and an optical component to detect or received light.

2. Description of the Related Art

The services and functions that a display apparatus may provide a user have gradually expanded. Further, a display panel of the display apparatus continue to pursue high resolution and have also continued to increase in size. Additionally, there is a trend that while the display panel becomes larger, the width of a front frame covering the display panel is getting narrower and the thickness of the display apparatus is getting thinner. Also, as an interval between the front frame and the display panel becomes narrower, a user's degree of immersion while watching a video may increase.

Further, as the interval between the front frame and the display panel becomes narrower and the thickness of the display apparatus becomes thinner, the size of an optical component to detect light being incident from a remote controller outside the display apparatus has also gotten smaller. In some examples, in order to detect the incident light from a remote controller, the optical component is placed adjacent to the front frame within the display apparatus.

For example, FIG. 2 is a sectional view illustrating a conventional display apparatus. Referring to FIG. 2, a display apparatus 200 may include a display unit 210, a front frame 220, a light receiving portion 221, a sensor 230, a control board 235, and a main board 240.

Light being received through a medium (e.g., air) from the outside of the display apparatus 200 passes through the light receiving portion 221 fixed to a connection portion 220a, once more passes through the medium, and then, is detected by the sensor 230. A signal corresponding to the light detected by the sensor 230 passes through a plurality of cables 230a and 240a, a plurality of connectors 235a, 235b or 240b, and a control board 235, thereby being transmitted to the main board 240 behind the display unit 210. Alternatively, the signal corresponding to the light detected by the sensor 230 may be transmitted to the main board 240 through the single cable 240a, the plurality of connectors 235b or 240b, and the control board 235 to which the mounted sensor 230 is connected by a pattern of a conductive material.

SUMMARY

According to an aspect of an exemplary embodiment, there is provided a display apparatus including an optical component including a sensor, and an optical fiber component configured to transmit the electromagnetic transmission being incident on a front frame, to the sensor.

The optical fiber component may include a first light window configured to be exposed on the front frame, and a second light window configured to be adjacent to the sensor, wherein the optical fiber component includes an optical fiber configured to connect the first light window and the second light window.

The first light window may be configured to condense the electromagnetic transmission onto a light incident surface of the optical fiber.

The first light window may be formed so that a connection sectional area to be connected to the optical fiber is smaller than an exposed area to be exposed at the front frame.

The first light window may be configured to be replaceable.

The first light window may include locking protrusions, and wherein the first light window is configured to be removably mounted through one of a front surface and a rear surface of the front frame by using the locking protrusions.

The second light window may be configured to diffuse the incident electromagnetic transmission toward the sensor.

The second light window may be removably mounted to one of a top connection opening and a side connection opening of the optical component configured to house the sensor.

The sensor may be placed closer to one side of a main board away from a center point of the main board.

The optical component may include a circuit board on which the sensor is mounted, a housing surrounding the circuit board, and a connection opening that is formed in a surface of the housing and accommodates the second light window.

The display apparatus may further include a reflector that is formed within the housing such that the reflector faces the sensor and is configured to reflect the incident electromagnetic transmission from the second light window, wherein the reflector includes at least one of a reflective film, a reflective sheet, and a reflective paint.

The sensor may be connected to a main board through the circuit board, and wherein the circuit board includes at least one of micro controllers, condensers, resistors, and transistors.

The sensor may include at least one of an electromagnetic transmission receiving component configured to detect infrared rays, a photoconductive component configured to detect brightness of the electromagnetic transmission, and a luminous component.

The sensor may include a plurality of sensors, and wherein the plurality of sensors mounted on the circuit board are arranged in a perpendicular direction or in a horizontal direction based on a surface of the main board.

The optical fiber may include at least one of a single mode optical fiber and a multi mode optical fiber.

The exposed first light window may include a surface-treatment configured for at least one of light being incident onto the optical fiber and light outputted from the optical fiber.

According to an aspect of an exemplary embodiment, there is provided a display apparatus including a first light window configured to be exposed on a front frame and on which light is incident, an optical component disposed out of line-of-sight from the light incident on the front frame, wherein the optical component includes a sensor and a second light window to output the light that is incident through the first light window to the sensor, and an optical fiber connected to an end of the first light window and an end of the second light window, wherein the optical fiber is removably connected to at least one of an end of the first light window and an end of the second light window.

According to an aspect of an exemplary embodiment, there is provided a display apparatus including a sensor cover that is disposed on a main board on which a sensor is mounted, and wherein the sensor cover is configured to surround the sensor, and an optical fiber component including a first light window configured to be exposed in a front frame, a second light window configured to be connected to the sensor cover, and an optical fiber connecting the first light window and the second light window, wherein the optical fiber component receives light incident through the first light window and outputs the light through the second light window toward the sensor.

According to an aspect of an exemplary embodiment, there is provided a display apparatus including an optical component that is placed in a main board and includes a sensor connected to the main board, and an optical fiber unit including a first light window to be exposed in a front frame, a second light window to be connected to the optical component, and an optical fiber connecting the first light window and the second light window, wherein the optical fiber unit outputs light incident through the first light window toward the sensor through the second light window.

According to an aspect of an exemplary embodiment, there is provided a display apparatus including a display unit, a front frame supporting the display unit, a main board placed in a rear surface of the display unit, an optical component that is placed in the main board and includes a sensor electrically connected to the main board, and an optical fiber unit including a first light window to be exposed in the front frame, a second light window to be connected to the optical component, and an optical fiber connecting the first light window and the second light window, wherein the optical fiber unit outputs light incident through the first light window toward the sensor through the second light window.

BRIEF DESCRIPTION OF THE DRAWINGS

These and/or other aspects will become apparent and more readily appreciated from the following description of exemplary embodiments, taken in conjunction with the accompanying drawings of which.

DETAILED DESCRIPTION OF THE EXEMPLARY EMBODIMENTS

Figure 1:
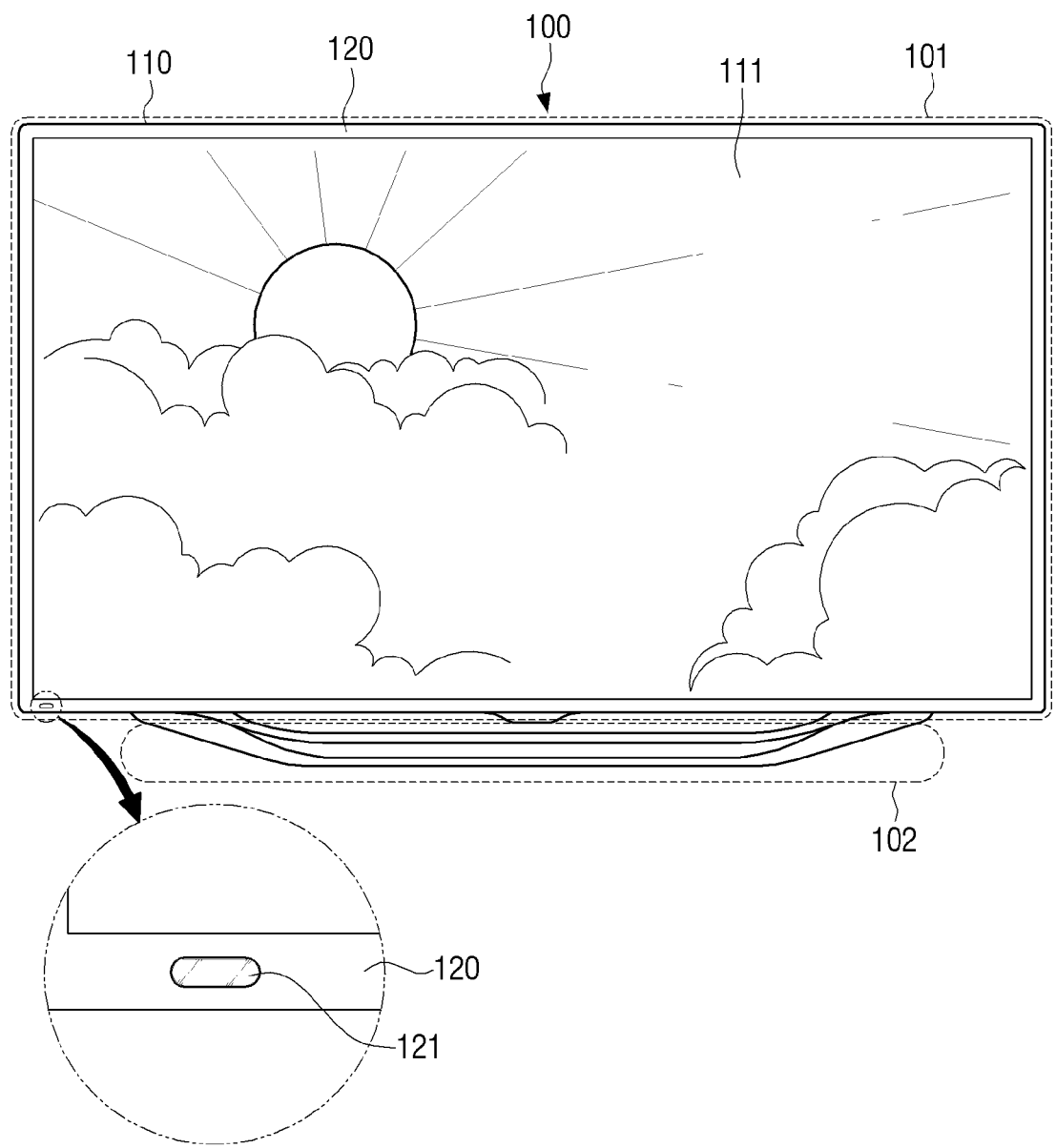
FIG. 1 is a front view illustrating a display apparatus according to an exemplary embodiment.
Figure 2:
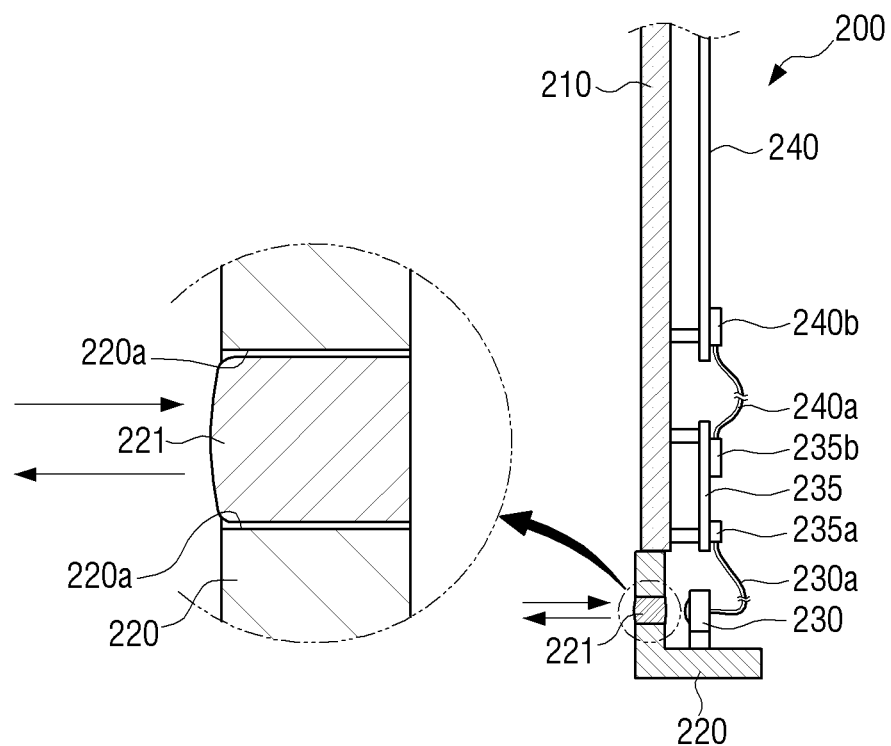
FIG. 2 is a sectional view illustrating a conventional display apparatus.

Hereinafter, certain exemplary embodiments of the present disclosure will be described in detail with reference to the accompanying drawings. Also, methods of manufacturing and using certain embodiments of the present disclosure will be described in detail with reference to the accompanying drawings. Throughout the drawings, like reference numerals will be understood to refer to like parts, components and structures.

While terms including ordinal numbers, such as "first" and "second," etc., may be used to describe various components, such components are not limited to the above terms. The above terms are used only to distinguish one component from another. For example, a first component may be referred to as a second component without departing from the scope of rights of the present invention, and likewise a second component may be referred to as a first component. The term "and/or" encompasses both combinations of the plurality of related items disclosed and any one item from among the plurality of related items disclosed.

The terms used herein are for the purpose of describing particular embodiments only and is not intended to limit the present invention. As used herein, the singular forms "a", "an" and "the" are intended to include the plural forms as well, unless the context clearly indicates otherwise. It will be further understood that the terms "including" or "having," etc., when used in this specification, specify the presence of stated features, integers, steps, operations, elements, components, and/or combinations thereof but do not preclude the presence or addition of one or more other features, integers, steps, operations, elements, components, and/or groups thereof. Throughout the drawings, like reference numerals will be understood to refer to like parts, components and structures.

FIG. 1 is a front view illustrating a display apparatus according to an exemplary embodiment. According to one or more exemplary embodiments the display apparatus may be a flat panel display in the form of a television, computer monitor, tablet, smartphone, projector, etc.

Referring to FIG. 1, a display apparatus 100 may include a main body 101 and a stand 102 supporting the main body 101.

The main body 101 may include a display unit 110 containing a display panel 111 and a front frame 120, which may also be called a front bezel, supporting the display panel 111. The front frame 120 may include a light window 121 configured to receive an electromagnetic transmission such as light, ultraviolet rays, visible rays, or infrared rays from the outside (e.g., sun, lighting, or a remote controller). Also, the light window 121 may output an electromagnetic transmission such as light being provided from the inside of the display apparatus 100 (e.g., light emitting from a light-emitting element) to the outside.

The display apparatus 100 may control operations of the display apparatus 100 by analyzing the light received through the light window 121. For example, the control of the display apparatus 100 may include power control (on/off), volume adjustment, channel adjustment, muting, external input control, internet searching using a communication unit, character input, request to run stored content by using applications, and the like.

Referring to FIG. 1, a single light window 121 is exposed on the left lower side of the front frame 120, but not limited thereto. A plurality of light windows may be exposed. The light window 121 may be exposed on at least one of the front and up/down/left/right surfaces (through which the display panel 111 is exposed) of the front frame 120 to correspond to input/output of the light. Alternatively, the light window 121 may be exposed on at least one of four side surfaces of the front frame 120 (corresponding to the thickness of the front frame 120).

The stand 102 may include a wall mount to support the main body 101 from a wall.

FIGS. 3A to 3D are sectional views substantially illustrating a display apparatus according to exemplary embodiments.

Referring to FIGS. 3A to 3D, the display apparatus 300 includes a display unit 310, a front frame 320, an optical fiber unit 330, an optical component 335, and a main board 340. The front frame 320 supports the display unit 310. The light unit 335 is electrically connected to the main board 340.

The display unit 310 may include a display panel 311, an optical film, a light guide plate, a middle frame, a light emitting diodes array, or a back chassis. The display unit 310 may include a single or a plurality of driver boards that is placed behind the display unit 310 and controls the display panel 311 and the light emitting diodes array. The display unit 310 is electrically connected to the driver board. The driver board is electrically connected to the main board 340 that is placed behind the display unit 310 at one side of the driver board.

The thickness of the display apparatus 300 includes the sum of the thickness of the front frame 320, the thickness of the middle cover, and the thickness of the back cover. Accordingly, if the thickness of the front frame 320 is thinner, the overall thickness of the display apparatus 300 may be thinner.

According to one or more exemplary embodiments, at least one component may be added to or deleted from components that are involved in the display unit 310 in response to the performance of the display apparatus 300. Also, the positioning of the components involved in the display unit 310 may be changed in accordance with a desired performance or structure of the display apparatus 300 in a manner such that the positioning can be understood by a person having the ordinary skill in the art.

The optical fiber unit 330 may include a first light window 331 configured to receive light from the outside, a second light window 333 configured to output the light received by the first light window 331, and an optical fiber 332 connecting the first light window 331 and the second light window 333. Accordingly to an exemplary embodiment the second light window may also be called a signal transmitter or diffuser while the first light window may be called a signal receptor or condenser. Further, according to an alternate exemplary embodiment, the first and second light windows may be called signal adjusters. These signal adjusters may both condense and diffuse light depending on the direction the light is traveling through the signal adjuster. For example, a first light window, or first signal adjuster, may condense light received from an emitter and then the second signal adjuster, or second light window, may diffuse that light as it passes towards sensors. Also the second signal adjuster may condense an outbound light signal that enters the second signal adjuster traveling toward the first signal adjuster, while the first signal adjuster diffuses the outbound light signal as it passes through and exits the overall apparatus.

The first light window 331 may be made of a transparent material, an opaque material, or a material having a color layer that corresponds to the interference caused by external lightings and may be configured to transmit the received light through the optical fiber 332. The material of the first light window 331 may include optical glasses (e.g., crown glasses, flint glasses, barium crown glasses), plastics (e.g., poly-methyl-meta-acrylate (PMMA), poly-carbonate, allyl-diglycol-carbonate).

The first light window 331 may condense the incident light onto a light incident surface 332a of the optical fiber 332. If a surface of the first light window 331 that is exposed through an opening 320a of the front frame 320 is a convex shape having a radius of curvature (e.g., a convex lens shape), the incident light may be condensed onto the light incident surface 332a of the optical fiber 332. The light incident surface 332a is a surface corresponding to the entrance of the optical fiber 332. Alternatively, according to another exemplary embodiment, if the surface of the first light window 331 that is exposed through the opening 320a of the front frame 320 is a flat shape, the light that is incident may correspond to an internal light guide within the first light window 331 and may be condensed onto the light incident surface of the optical fiber 332 by the internal light guide.

To what degree the light is refracted in the first light window 331 may vary depending on a refractive index of the first light window 331. For example, if the refractive index of the first light window 331 is high, the length of the first light window 331 corresponding to the thickness of the front frame 320 may be shortened. Further, as the technology development of the display apparatus 300 continues, the thickness of the front frame 320 is getting thinner. The thinner the thickness of the front frame 320 is, the shorter the length of the first light window 331, to which the high refractive index is applied, is. Taking into consideration the thickness of the front frame 320 and the length of the first light window 331, the refractive index $n_d$ of the first light window 331 according to an exemplary embodiment may be $1.34 \leq n_d \leq 1.60$. Alternatively, the refractive index $n_d$ of the first light window 331 according to another exemplary embodiment may be $1.30 \leq n_d \leq 1.75$.

An exposed area of the first light window 331 exposed on the front frame 320 may be larger than a connection sectional area being connected to the optical fiber 332 (e.g., a sectional area of the optical fiber including a synthetic resin cloth, the connection sectional area the sectional area of the optical fiber). The connection sectional area according to an exemplary embodiment may be 15% to 40% of the exposed area. Alternatively, the connection area may be 5% to 25% of the exposed area. If the first light window 331 is reduced in size or if the optical fiber 332 is thickened, the sectional area of the optical fiber 332 may be substantially the same as the exposed area of the first light window 331 (e.g., the difference of less than 5% in the sectional area).

The shape of the front surface of the first light window 331 that is exposed through the opening 320a of the front frame 320 may be a geometrical figure. The geometrical figure of the front surface of the first light window 331 according to an exemplary embodiment may be, for example, a two-dimensional figure (e.g., a plane figure) that is exposed on the front frame 320 or a three-dimensional figure (e.g., a three-dimensional shape). The geometrical figure may include squares, rectangles, polygons, cubes, octahedrons, rhombus, triangles, isosceles triangles, pyramids, triangular prisms, circles, ellipses, spheres, cones, cylinders, stars, drops of water, etc. Also, the geometrical figure may have a surface-treated surface (e.g., irregularities, geometric patterns, convex embossing, or concave embossing).

The optical fiber 332 may have a double-cylindrical shape consisting of a core of a glass with a high refractive index and a cladding of a glass with a low refractive index.

The optical fiber 332 may transmit the light that is incident onto the first light window 331 by passing the light through the core thereof to the second light window 333 by total reflection. The outside of the cladding may be wrapped by a synthetic resin cloth for external shock-resistant. The diameter of the optical fiber 332, excluding the synthetic resin cloth, may be one hundred micrometers to several hundred micrometers ($\mu m$).

An optical fiber with the core of which the diameter is less than 10 $\mu m$ is called as a single-mode optical fiber, and an optical fiber with the core of which the diameter is less than 100 $\mu m$ is called as a multi-mode optical fiber. The optical fiber 332 according to an exemplary embodiment may include the single-mode optical fiber or the multi-mode optical fiber. A loss rate of light or data which the optical fiber 332 transmits and receives is low because the optical fiber 332 has small energy loss and because the optical fiber 332 receives little external influence (e.g., interference, crosstalk, etc.). The optical fiber 332 according to an exemplary embodiment may include optical fibers without the synthetic resin cloth or optical fibers with the synthetic resin cloth.

The optical fiber 332 may be fitted into the first light window through a provided opening configured such that the optical fiber can be inserted into the fitted opening of the first light window 331. Alternatively, the optical fiber 332 may be bonded to the first light window 331 by using an adhesive material that is coated on the outer surface of the optical fiber 332 or a connection portion of the first light window 331.

The second light window 333 may output the light that is incident on the first light window 331 that is reflected through the optical fiber 332 toward the sensor 337 inside the optical component 335. For example, the second light window 333 may diffuse the light toward the sensor 337 so that the sensor 337 inside the optical component 335 can detect the light.

The second light window 333 may be made of a transparent material, an opaque material, or a material having a color layer that transmits the light that is reflected to the sensor 337. The material of the second light window 333 may include optical glasses (e.g., crown glasses, flint glasses, barium crown glasses), plastics (e.g., poly-methyl-meta-acrylate, poly-carbonate, allyl-diglycol-carbonate).

Figure 3A:
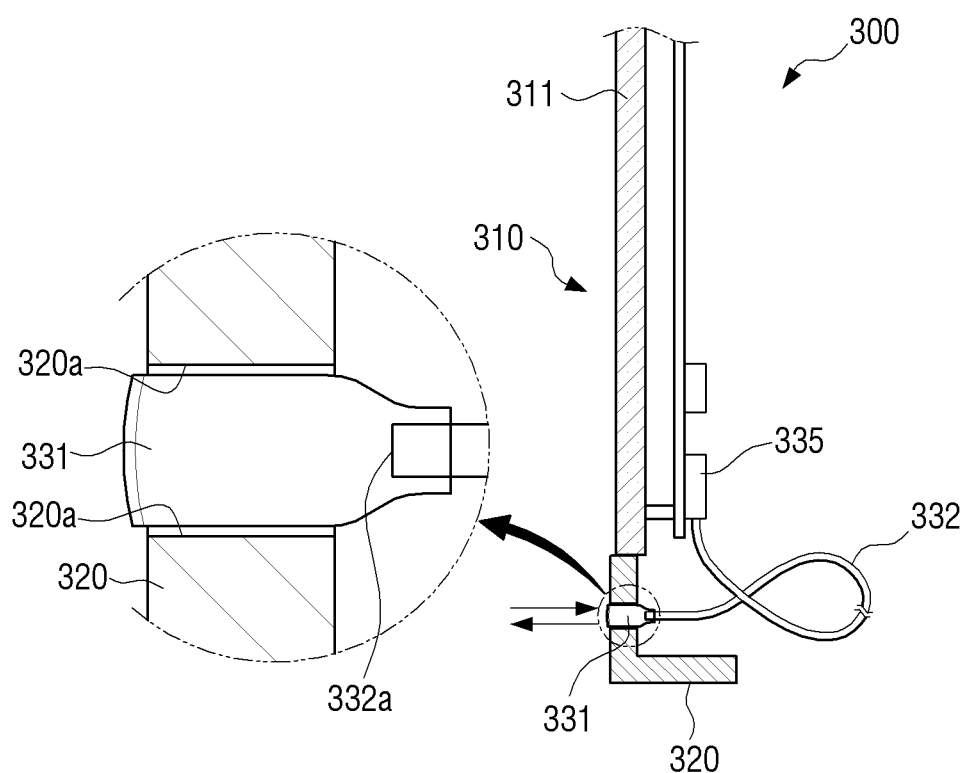
FIGS. 3A through 3D are sectional views illustrating a display apparatus according to one or more exemplary embodiments.
Figure 3B:
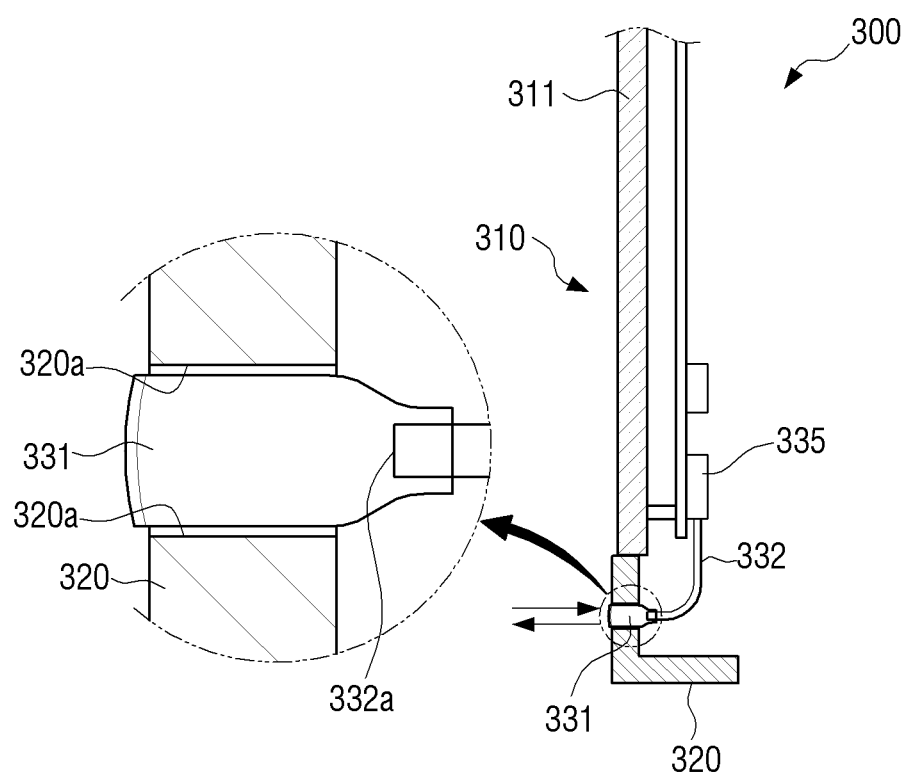
Figure 3C:
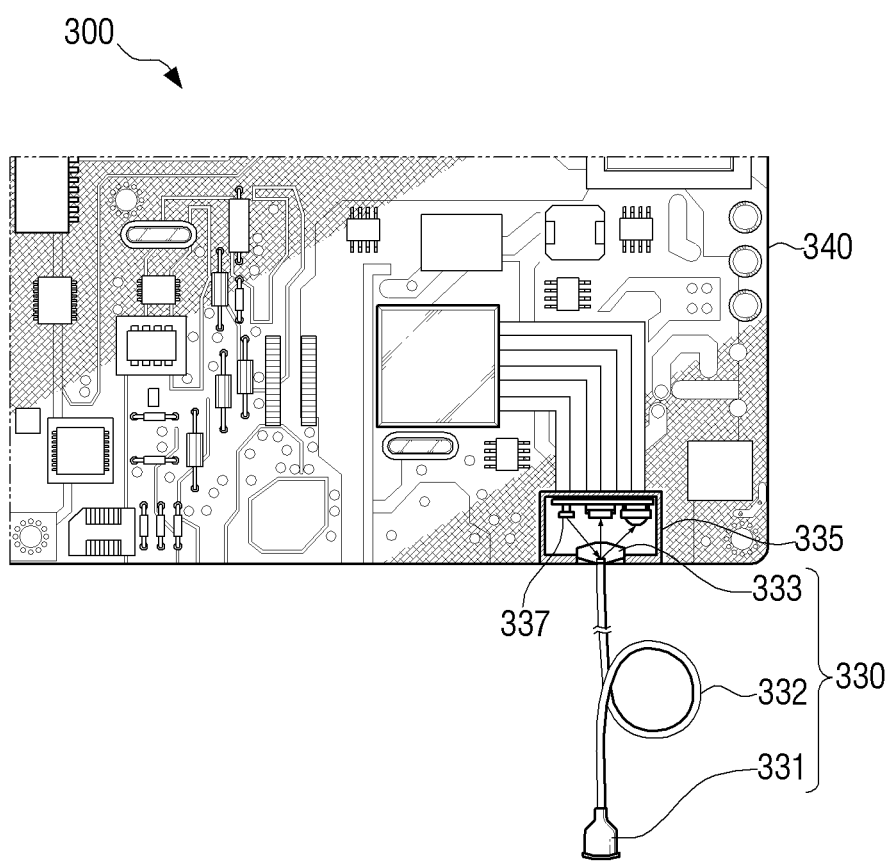
Figure 3D:
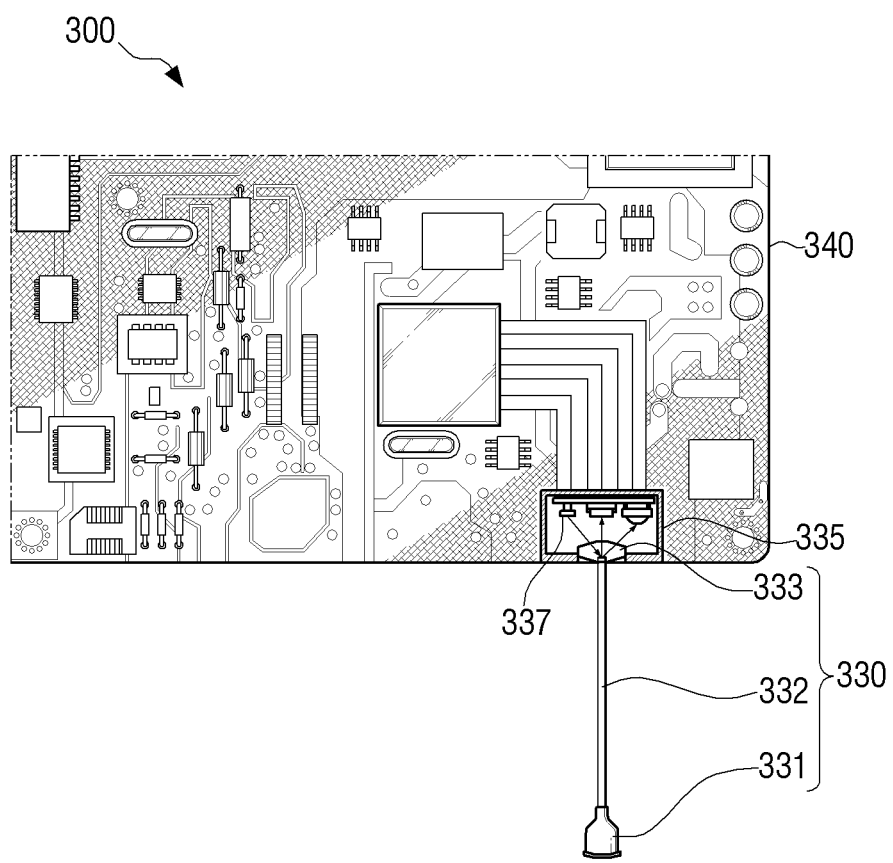

Referring to FIGS. 3C and 3D, the second light window 333 may be formed so that an output area facing the sensor 337 is larger than an area of a light output surface of the optical fiber 332. When being viewed from a top view, the second light window 333 may be an octagon, a hexagon, or a concave lens. Alternatively, the second light window 333 may be an octagonal pillar with a low height, a hexagonal pillar with a low height, or a concave lens shape. The light output surface of the optical fiber 332 may be connected through a side surface of the polygonal pillar of the second light window 333. For example, the light output surface of the optical fiber 332 may be inserted through the side surface of the polygonal pillar of the second light window 333. The light totally reflected in the optical fiber 332 may be output to the sensor 337 through side surfaces of the polygonal pillar of the second light window 333 corresponding to the light output surface of the optical fiber 332.

The area of the output surface of the second light window 333 may have two side surfaces or three side surfaces of the polygonal pillar to facing the light output surface of the optical fiber 332. The area of the output surface of the second light window 333 may be 20% to 40% of the area of the light output surface. Alternatively, the area of the output surface of the second light window 333 may be 10% to 30% of the area of the light output surface. The area of the light incident surface of the optical fiber 332 may be substantially the same as the area of the light output surface (e.g., a ratio of the light incident surface area and the light output surface area is within ±8%).

Referring to FIGS. 3C and 3D, the shape of the second light window 333 may be a polygonal pillar. Alternatively, the shape of the second light window 333 may be a polygonal pillar corresponding to the number of the sensors 337 to detect the light being output from the second light window 333.

If there are three sensors 337 inside the optical component 335, the second light window 333 may be an octagonal pillar. The second sensor of the three sensors may be placed at an opposite position corresponding to an imaginary straight line (e.g., passing through the side surface of the second light window 333) extending from a center of the light output surface of the optical fiber 332 (e.g., the core of the optical fiber). Alternatively, if there are three sensors 337 inside the optical component 335, the second light window 333 may be a hexagonal pillar. The second sensor of the three sensors may be placed at the opposite position corresponding to an imaginary straight line (e.g., passing through the side edge of the second light window 333) extending from the center of the light output surface of the optical fiber 332.

If there are two sensors 337 inside the optical component 335, the second light window 333 may be a hexagonal pillar. No sensor may be placed at the opposite position corresponding to an imaginary straight line (e.g., passing through the side surface of the second light window 333) extending from the center of the light output surface of the optical fiber 332. Alternatively, if there are two sensors 337 inside the optical component 335, the second light window 333 may be an octagonal pillar. No sensor may be placed at the opposite position corresponding to an imaginary straight line (e.g., passing through the side edge of the second light window 333) extending from the center of the light output surface of the optical fiber 332.

The shape of the front surface of the second light window 333 facing the sensor 337 may be a geometrical figure. The geometrical figure of the front surface of the second light window 333 facing the sensor 337 according to an exemplary embodiment means, for example, a two-dimensional figure (e.g., a plane figure) or a three-dimensional figure (e.g., a three-dimensional shape). The geometrical figure may include squares, rectangles, polygons, cubes, octahedrons, rhombus, triangles, isosceles triangles, pyramids, triangular prisms, circles, ellipses, spheres, cones, cylinders, stars, drops of water, etc.

The optical fiber 332 may be fitted into the second light window through a provided opening configured such that the optical fiber can be inserted into the fitted opening of the second light window 333. Alternatively, the optical fiber 332 may be bonded to the second light window 333 by using an adhesive material that is coated on the outer surface of the optical fiber 332 or a connection portion of the second light window 333.

Figure 4A:
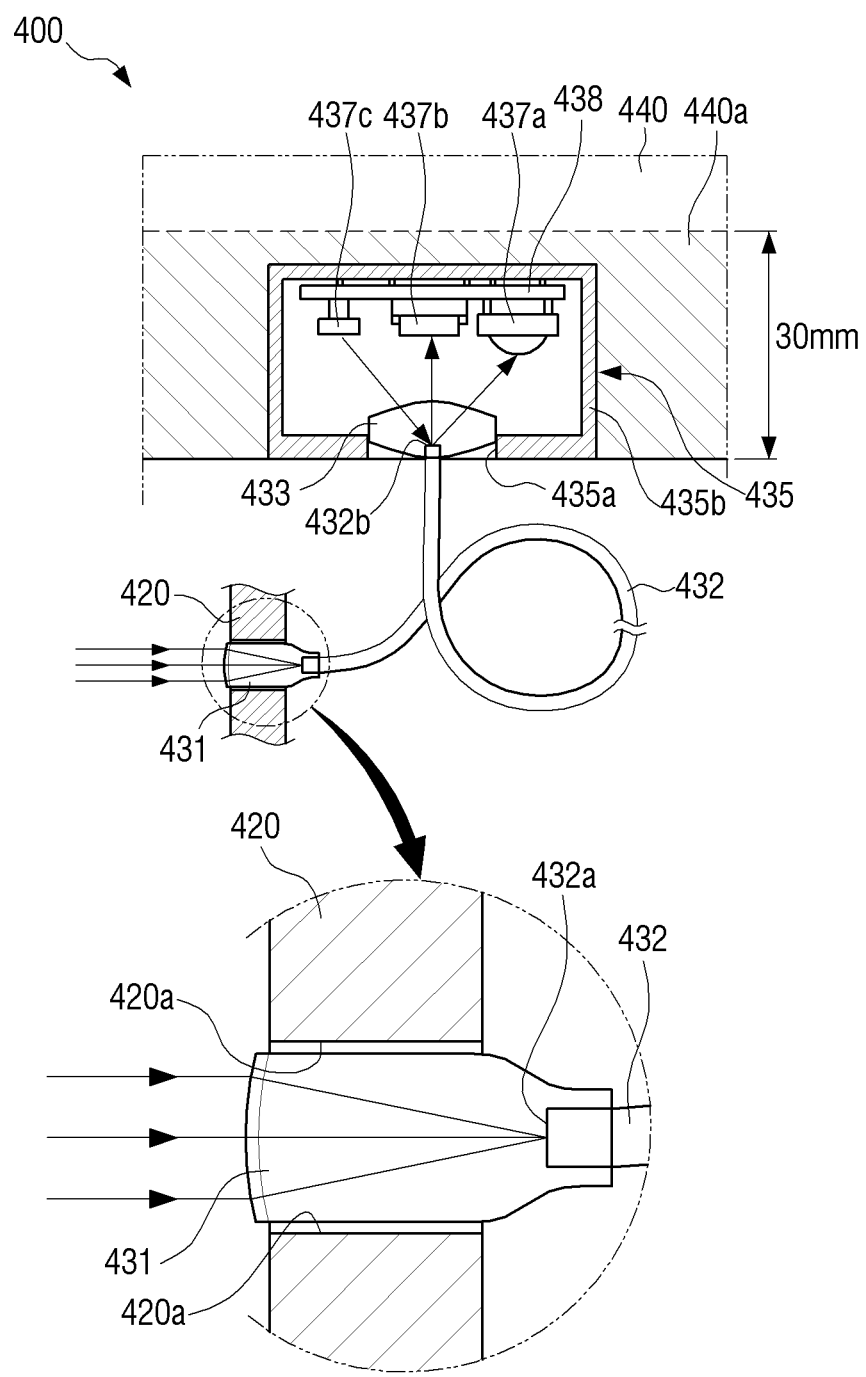
FIGS. 4A and 4B are sectional views illustrating an optical fiber unit and an optical unit according to one or more exemplary embodiments.
Figure 4B:
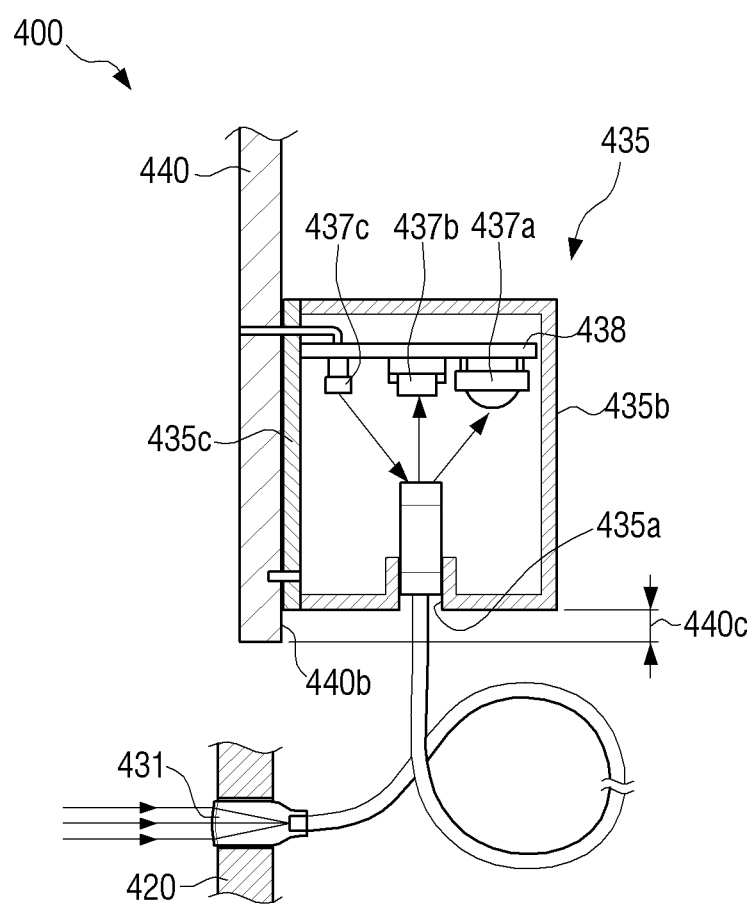

FIGS. 4A and 4B are sectional views substantially illustrating an optical fiber unit and an optical component according to an exemplary embodiment.

Referring to FIGS. 4A and 4B, the optical component 435 may include a connection opening 435a to be connected to the second light window 433, the sensor 437 that is placed to face the second light window 433 and detects the light outputted from the second light window 433, a circuit board 438 on which the sensor 437 is mounted, and a housing 435b.

The optical component 435 may have a prism shape (e.g., a rectangular prism, a hexagonal prism, or polygonal prism). Alternatively, the shape of the optical component 435 may be a geometrical figure.

The optical component 435 may be placed in a side zone 440a of the main board 440 (e.g., a zone of 30 mm away in the direction to a center point of the main board 440 from one side). The center point of the optical component 435 may be placed closer to the one side of the main board 440 than the center point of the main board 440. For example, the entire area of the optical component 435 (e.g., the area of a bottom surface 435c of the optical component 435) may be placed within the side zone 440a. Alternatively, some area of the optical component 435 (e.g., more than 10% of the area of the bottom surface 435c of the optical component 435) may be placed within the side zone 440a. That the area of the side zone 440a may be changed depending on the size and structure of the main board 440 can be understood easily by a person having the ordinary skill in the corresponding art.

If the first light window 431 is exposed on the left lower side of the front frame 420, the closer to one side 440b of the main board 440 (e.g., when the display apparatus 400 is supported by the stand 402, a bottom side or a right side of the main board 440) the side surface 435c of the optical component 435 is, the more the length of the optical fiber unit 430 (e.g., a total length of the first light window 431, the optical fiber 432, and the second light window 433 that are connected) may be shortened. Referring to FIG. 4B, the side surface 435c of the optical component 435 may reach an imaginary straight line 440c extending from the one side 440b of the main board 440. Referring to FIG. 4B, the side surface 435c of the optical component 435 may be spaced apart a predetermined distance (e.g., less than 5 mm) from, and may not reach the imaginary straight line 440c extending from the one side 440b of the main board 440. Alternatively, the side surface 435c of the optical component 435 may go beyond the imaginary straight line 440c extending from the one side 440b of the main board 440, thereby projecting from the main board 440. That the predetermined distance may be changed depending on the size of the optical component 435, the size of the main board 440, and the connection structure between the optical component 435 and the main board 440 can be understood easily by a person having the ordinary skill in the corresponding art.

If a case in which the first light window 431 is exposed on the left lower side of the front frame 420 and the one side surface 435c of the optical component 435 does not reach the imaginary straight line extending from the one side 440b of the main board 440 (e.g., FIG. 4B) is compared with a case in which the one side surface 435c of the optical component 435 projects out from the main board 440, in the case in which the one side surface 435c of the optical component 435 projects out from the main board 440, the total length of the optical fiber unit 430 may be shorter.

Referring to FIGS. 3A and 3C, the optical fiber 332 of the optical fiber unit 330 is wound, but is not limited thereto. Referring to FIGS. 3B and 3D, the optical fiber 332 of the optical fiber unit 330 may connect smoothly the first light window 331 and the second light window 333 without winding (e.g., the optical fiber 332 with a short length connects the first light window 331 and the second light window 333 in a straight line or a curved line).

A rear surface of the optical component 335 (e.g., a surface surrounding the inner part of the optical component 335) may include a reflector to reflect the light outputted from the second light window 333. For example, the reflector of the rear surface of the optical component 335 may be formed by attaching of a reflective film, attaching of a reflective sheet, coating of a reflective paint, etc., and may reflect the light outputted from the second light window 333 in order for the sensor 337 to detect the light. The reflectance for the incident light of each of the reflective film and the reflective sheet of a mirror material may be 90% to 98%. In general, the sum of reflectance, transmittance, and absorption is one (1). The thickness of the reflective film may be 0.02 mm to 0.2 mm. The thickness of the reflective sheet may be 0.02 mm to 0.2 mm. Also, the reflectance of the reflective paint of a mirror material may be 92% to 97%. The coating thickness of the reflective paint on the rear surface of the optical component 435 may be 30 μm to 200 μm.

The reflector according to an exemplary embodiment is not limited to the reflective materials, reflective properties, etc. For example, the reflector is sufficient if it can reflect the light outputted through the second light window so that the sensor detects the light as well as the reflective film, the reflective sheet and the reflective paint.

The connection opening 435a of the optical component 435 is an opening into which the second light window 433 is inserted. Referring to FIGS. 4A and 4B, the second light window 433 may be inserted into the inside of the optical component 435 through the connection opening 435a formed on the side surface of the optical component 435. The second light window 433 may be inserted through the connection opening 435a of the optical component 435 that is spaced apart a predetermined distance (e.g., less than or equal to 30 mm) from the surface of the main board 440 substantially parallel to the main board 440 (e.g., less than or equal to an angle of ±15 degrees with respect to an imaginary straight line extending from the center of the optical fiber 432).

The second light window 433 may be inserted in the connection opening 435a with the fit. The second light window 433 may be inserted in the connection opening 435a with the tough fit or the snug fit. The second light window 433 may be mounted to or separated from the optical component 435 through the connection opening 435a of the optical component 435. Alternatively, the connection opening 435a of the optical component 435 may have an opening structure corresponding to locking protrusions of the second light window 433.

The optical component 435 may include at least one sensor 437. The sensor 437 may be mounted on the circuit board 438 inside the optical component 435. The sensor 437 may be electrically connected to the main board 440. The sensor 437 may include at least one of a light receiving component 437a that can detect infrared rays (e.g., an infrared sensor), a photoconductive component 437b that can detect the brightness of the light outside the display apparatus 400 (e.g., an illuminance sensor), and a luminous component 437c that can output light corresponding to the state of the display apparatus 400 outside the display apparatus 400 (e.g., a light emitting diode). For example, the sensor 437 may include at least one of the light receiving component, the photoconductive component, and the luminous component or combination of the light receiving component, the photoconductive component, and the luminous component. In another exemplary embodiment, the optical component may contain a sensor that only receives or detects electromagnetic transmission and further includes a separate output component. The output component may be a transmitter including a luminous component that can output light corresponding to the state of the display apparatus outside the display apparatus (e.g., a light emitting diode). Alternatively, the sensor 437 may include four or more sensors including the light receiving component, the photoconductive component, and the luminous component.

The light receiving component 437a may analyze a control signal (e.g., a power control signal or a volume adjustment signal) of a remote controller by filtering an infrared range from the light outputted through the second light window 433. The display apparatus 400 may perform the control of the display apparatus 400 (e.g., power control, volume adjustment, channel changing, muting, external input control, internet searching, characters input, execution of applications, and the like) by analyzing the received light.

The photoconductive component 437b may detect the brightness of the light outside the display apparatus 400 by filtering a visible light region from the light outputted through the second light window 433. The display apparatus 400 may control the brightness of the display panel 411 of the display unit 410 to correspond to the brightness of the detected light. Also, the photoconductive component 437b may detect the brightness of the light outside the display apparatus 400 by using the entire light regions including the visible light region, the infrared region and the ultraviolet region from the light outputted through the second light window 433.

The luminous component 437c may output light corresponding to the state of the display apparatus 400 through the second light window 433. For example, the luminous component 437c may output light to the second light window 433 in response to the power on/off.

Because each of the plurality of sensors 437a, 437b, and 437c detects a different range of the light (e.g., infrared rays, visible rays, ultraviolet rays, etc.), when the light is output through the second light window 433, there is no problem in detecting the light. Further, light may be detected by the photoconductive component 437b due to the light emitted by the luminous component 437c. Accordingly, the photoconductive component 437b may be restricted from detecting the light in response to the light emitted by the luminous component 437c (e.g., turning the photoconductive component 437b off).

The display apparatus 400 may have a plurality of processors. When the power is turned on, a main processor may control the display apparatus 400. Also, when the power is turned off, a sub-processor separate from the main processor may control the display apparatus 400. When light is output through the second light window 433, another processor may be used to control the power and operation of the sensors 437a, 437b, and 437c to detect light in response to the power on/off of the display apparatus 400. Also, other processor (e.g., one of the main process and the sub-processor) may be used to process signals being outputted from the sensors 437a, 437b, and 437c.

Referring to FIGS. 4A and 4B, the arrangement order of the sensors 437a, 437b, and 437c may be found. Referring to FIG. 4A, the luminous component 437c, the photoconductive component 437b, and the light receiving component 437a may be placed from the right side of the optical component 435 in the left horizontal direction. Referring to FIG. 4B, the luminous component 437c, the photoconductive component 437b, and the light receiving component 437a may be laminated in the perpendicular direction based on the bottom surface 435c of the optical component 435.

That mutual position of the sensors 437a, 437b, and 437c may be changed to correspond to performance and structure parameters of the display apparatus 400 such that they can be understood by a person having the ordinary skill in the art.

The sensors 437a, 437b, and 437c may be mounted at an incline on the circuit board 438 in order to improve a light reception rate to correspond to the second light window 433. Alternatively, the sensors 437a, 437b, and 437c may be mounted in a fan shape on the circuit board 438 in order to improve the light reception rate to correspond to the second light window 433. For example, when the circuit board 438 on which the sensors 437a, 437b, and 437c are mounted is placed on the bottom surface 435c of the optical component 435, the plurality of sensors 437a, 437b, and 437c may not be mounted in a row, but in a fan-shape.

The optical component 435 includes the circuit board 438. The sensors 437 are mounted on the circuit board 438, respectively. Also, at least one of condensers, resistors, micro controllers, and transistors corresponding to the operation or control of the sensor 437 may be mounted on the circuit board 438.

The sensor 437 may be connected to the main board 440 through the circuit board 438. For example, the sensor 437 may be connected to the main board 440 through a pattern of conductive material of the circuit board 438. Alternatively, the sensor 437 may be connected to the main board 440 through a connector connected with the pattern of conductive material of the circuit board 438.

The circuit board 438 may be placed in the direction of one of a horizontal direction (e.g., parallel to the bottom surface 435c) and a vertical direction (e.g., perpendicular to the bottom surface 435c) based on the bottom surface 435c of the optical component 435. The position of the circuit board 438 inside the optical component 435 may be changed to correspond to the position of the second light window 433. The position of the circuit board 438 inside the optical component 435 may be changed to correspond to a light receiving surface of the sensor (e.g., components 437a and 437b) that faces the second light window 433 and detects light outputted from the second light window 433. Alternatively, the position of the circuit board 438 inside the optical component 435 may be changed to correspond to a light emitting surface of the sensor (e.g., component 437c) that faces the output surface of the second light window 433 and outputs light to the second light window 433.

The optical component 435 includes the housing 435b. The optical component 435 may accommodate the sensor 437 and the circuit board 438 by using the housing 435b and the bottom surface 435c. The optical component 435 may be separated from the outside (e.g., disturbance or interference from the outside of the optical component 435) by the housing 435b and the bottom surface 435c. For example, the optical component 435 may be shielded from the outside by combining the housing 435b and the bottom surface 435c. Also, for shielding from the outside, a plastic shutter may be added to an entrance of the connection opening 435a which is placed on a side surface of the housing 435b of the optical component 435.

The housing 435b may have a structure such that the bottom surface 435c is opened to correspond to the side surfaces and the top surface of the optical component 435. Alternatively, the housing 435b may be formed so that a side surface and a top surface thereof is separated and combined to correspond to the side surfaces and top surface of the optical component 435.

An optical component 435 according to another exemplary embodiment may include an optical component formed integrally with the second light window 433. The optical fiber 432 may be connected through the connection opening 435a which is placed on a side surface of the optical component formed integrally with the second light window 433. For example, the optical fiber 432 may be inserted in the second light window 433 through the connection opening 435a of the optical component formed integrally with the second light window 433. Also, the optical fiber 432 may be mounted to and separated from the second light window 433 with the fit through the connection opening 435a of the optical component formed integrally with the second light window 433.

Figure 5:
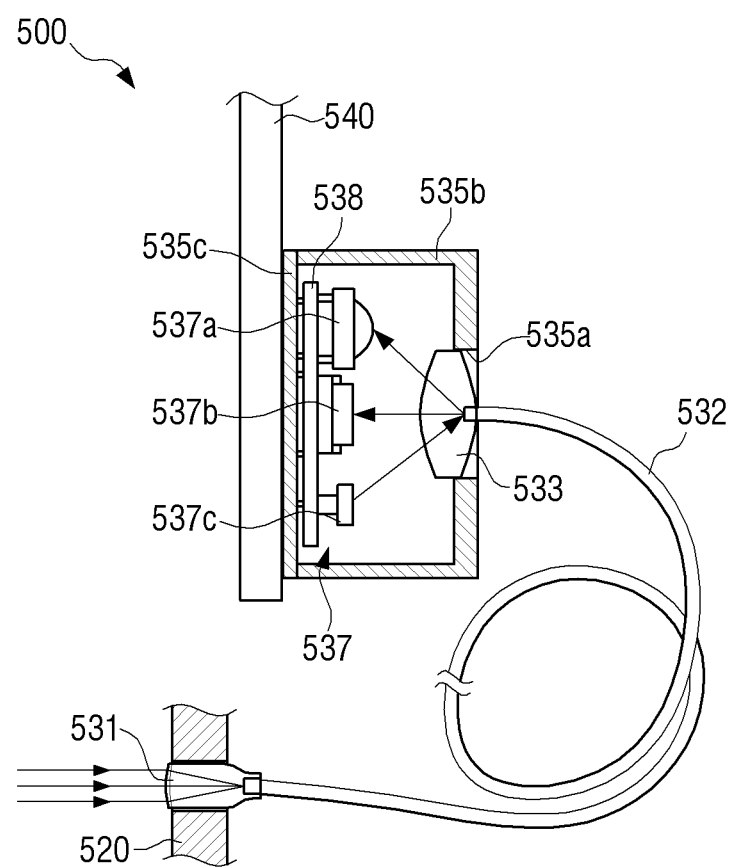
FIG. 5 is a sectional view illustrating an optical fiber unit and an optical component according to an exemplary embodiment.

FIG. 5 is a sectional view substantially illustrating an optical fiber unit and an optical component according to another exemplary embodiment.

Referring to FIG. 5, the optical component 535 may include a connection opening 535a to be connected to the second light window 533, a sensor 537 that is placed to face the second light window 533 and configured to detect light outputted from the second light window 533, a circuit board 538 on which the sensor 537 is mounted, and a housing 535b.

The second light window 533 may be inserted into the inside of the optical component 535 through the connection opening 535a which is placed on a side surface of the housing 535b of the optical component 535 unlike the connection opening which is placed on the lower surface of the housing 535b of the optical component 535, as also shown and illustrated in FIG. 4B. The second light window 533 may be inserted in the inside of the optical component 535 through the connection opening 535a of the housing 535b which is placed in the direction perpendicular to the surface of the main board 540. Also, the second light window 533 may be inserted in the inside of the optical component 535 through the connection opening 535a of the housing 535b which is placed in the vertical direction based on the sensor 537 mounted on the circuit board 538. For example, the photoconductive component 537b may be arranged on the circuit board 538 to face the second light window 533.

The length of the optical fiber 532 when the optical component 535 and the optical fiber unit 530 are connected to each other, as illustrated in FIG. 5, may be different from the length of the optical fiber 532 when the optical component 535 and the optical fiber unit 530 are connected to each other, which is, for example, illustrated in FIG. 4. The length of the optical fiber 532 of FIG. 5 may be longer than the length of the optical fiber 432 of FIG. 4B. If the optical fiber unit 530 has no winding, the length of the optical fiber 532 may be different depending on the location of the connection opening 535a or 535d which is placed on the housing 535b. The thickness of the display apparatus 500 when the optical component 535 is connected to the optical fiber unit 530 as illustrated in FIG. 5 may be different from the thickness of the display apparatus 500 when the optical component 535 is connected to the optical fiber unit 530 as illustrated in FIG. 4B. The thickness of the display apparatus 500 as illustrated in FIG. 5 may be thicker than the thickness of the display apparatus 400 as illustrated in FIG. 4B.

The components of the optical component 535 as illustrated in FIG. 5 except for the connection opening 535a of the optical component 535 is substantially the same as the components of the optical component 535 that was described in FIG. 4B; therefore, duplicate descriptions thereof will be omitted.

Figure 6A:
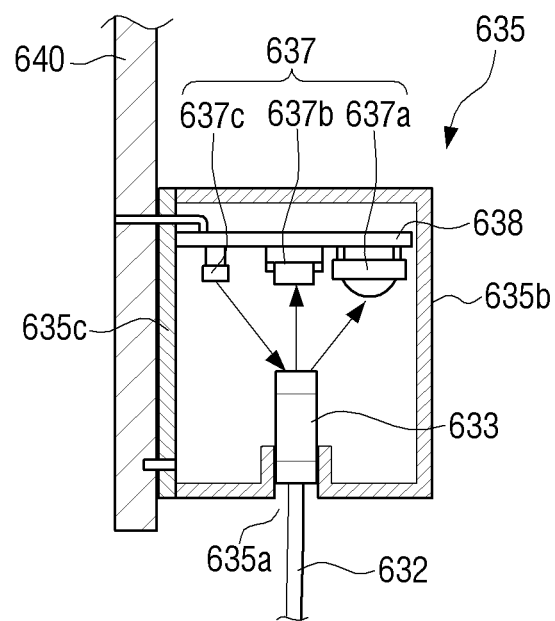
FIGS. 6A and 6B are sectional views illustrating connection of an optical component and a main board according to one or more exemplary embodiments.
Figure 6B:
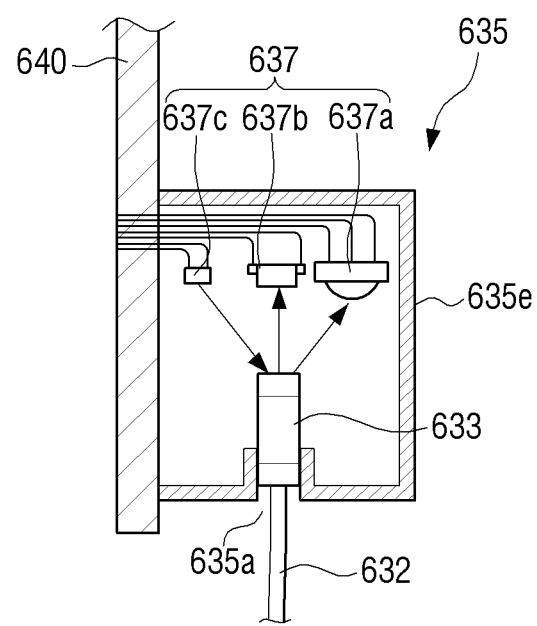

FIGS. 6A and 6B are sectional view substantially illustrating connection of an optical component and a main board according to an exemplary embodiment.

Referring to FIG. 6A, the optical component 635 accommodates the sensors 637 and the circuit board 638 through the housing 635b and the bottom surface 635c. The circuit board 638 on which the sensors 637 are mounted is connected to the main board 640 through the bottom surface 635c. The sensors 637 may be connected to the main board 640 through a connector connected to a pattern of conductive material of the circuit board 638. In FIG. 6A, the optical component 635 is a component separate from the main board 640.

Referring to FIG. 6B, the sensors 637 are directly mounted on the main board 640 without a circuit board. The sensors 637 are formed integrally with the main board 640. The optical component 635 according to another exemplary embodiment may have no sensors 637.

The sensors 637 may be surrounded by the housing 635b of the optical component 635 with no bottom surface 635c. The housing 635b of the optical component 635 with no bottom surface 635c may be called a sensor cover 635e. The sensor cover 635e may include a connection opening 635a corresponding to where it is formed. Also, at least one of condensers, resistors, microprocessors, and transistors which are placed on the circuit board 638 as illustrated in FIG. 6A may be mounted on the main board 640. Also, electronic circuit components including a high-performance processor (e.g., at least one of the main processor and the sub-processor) that is previously mounted on the main board 640 may operate to replace the condensers, resistors, microprocessors, and transistors which are mounted on the circuit board 638.

The components of the optical component 635 as illustrated in FIG. 6B except for the sensor cover 635e are substantially the same as the components of the optical component 635 that was described in FIGS. 4A, 4B, 5, and 6A; therefore, duplicate descriptions thereof will be omitted.

Figure 7:
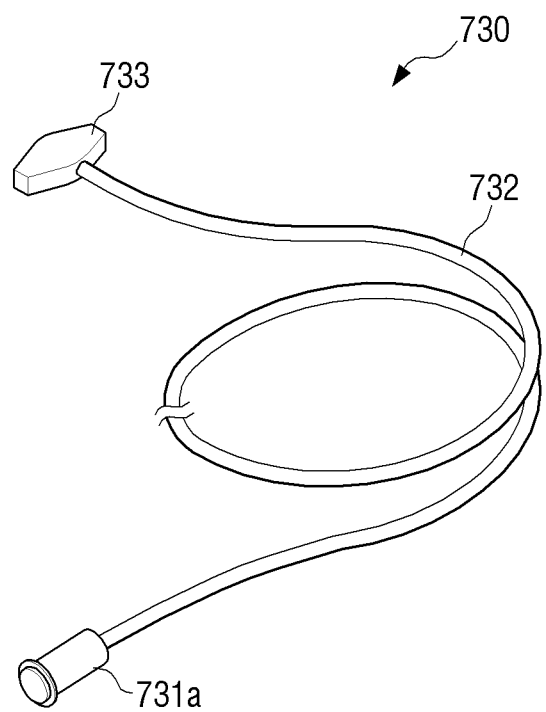
FIG. 7 is a perspective view illustrating an optical fiber unit according to an exemplary embodiment.

FIG. 7 is a perspective view illustrating an optical fiber unit according to another exemplary embodiment.

Referring to FIG. 7, the optical fiber unit 730 includes a first light window 731a, an optical fiber 732, and a second light window 733. As compared with FIG. 3C, the geometrical figure of a first light window 731a is different from the geometrical figure of the first light window 331. For example, a front surface of the first light window 731a that is exposed through the opening 720a of the front frame 720 may be a circle. Further, the shape of the first light window 731a may be a cylinder.

The first light window 731a as illustrated in FIG. 7 is only one example; therefore, it may be adjusted such that the first light window 731a corresponds to the shape or the size of the opening formed on the front frame. If the shape or size of the opening of the front frame is different from the first light window 731a, the first light window 731a may be adjusted or replaced by using a separate adaptor.

Figure 8A:
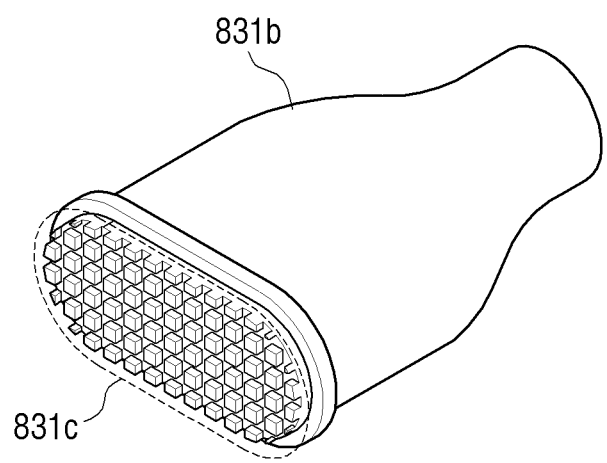
FIGS. 8A and 8B are perspective views illustrating a first light window according to one or more exemplary embodiments.
Figure 8B:
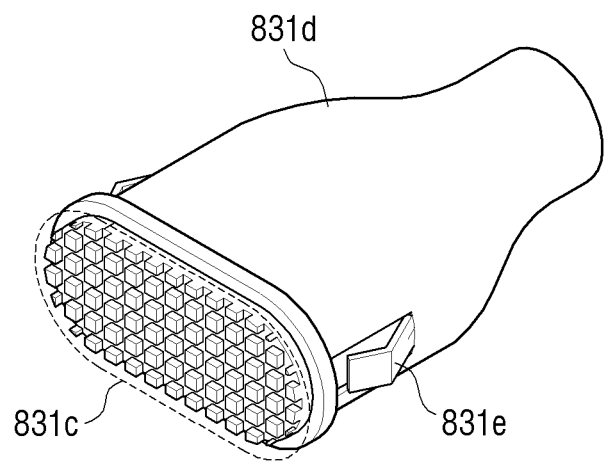

FIGS. 8A and 8B are perspective view illustrating a first light window according to one or more exemplary embodiments.

Referring to FIG. 8A, a first light window 831b has a surface-treated surface 831c in the first light window. The surface 831c of the first light window 831b may be surface-treated for at least one of condensing the incident light onto a light incident surface of an optical fiber and diffusing the light outputting through the light incident surface of the optical fiber from a luminous component. For example, the surface treatment may include painting, irregularities, geometric patterns, convex embossing, or concave embossing.

The first light window 831b having the surface-treated surface 831c may condense light being incident with lower output from a remote controller onto the light incident surface of the optical fiber or may diffuse light being outputted through the light incident surface of the optical fiber more widely than the totally reflected light.

Referring to FIG. 8B, the first light window 831d may have locking protrusions 831e on the first light window. The locking protrusions 831e may prevent the first light window from being separated from an opening of the front frame and allow the first light window 831d to be fixed to the opening of the front frame.

If an exposed area of the first light window 831d is larger than the connection sectional area of the optical fiber, the first light window 831d may be inserted into the opening from a connection portion to be connected to the optical fiber through the front surface of the front frame. For example, the first light window 831d may be mounted or separated through the opening from the front surface of the front frame in the direction of the opening.

If the exposed area of the first light window 831d is substantially the same as the connection sectional area of the optical fiber (e.g., the difference between the two areas is less than or equal to ±5%), the first light window 831d may be inserted into the opening from an exposed portion of the first light window through the rear surface of the front frame. For example, the first light window 831d may be mounted or separated through the opening from the rear surface of the front frame.

Figure 9A:
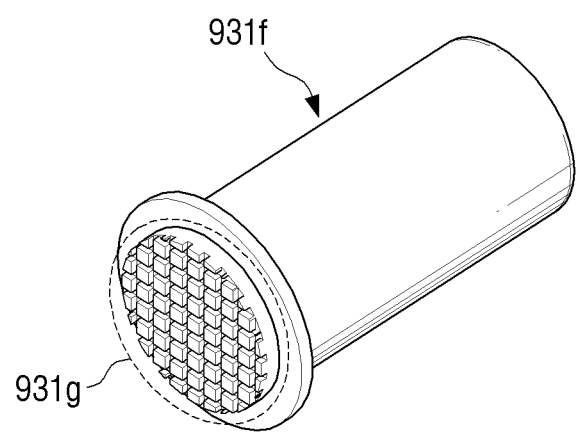
FIGS. 9A and 9B are perspective views illustrating a first light window according to one or more exemplary embodiments.
Figure 9B:
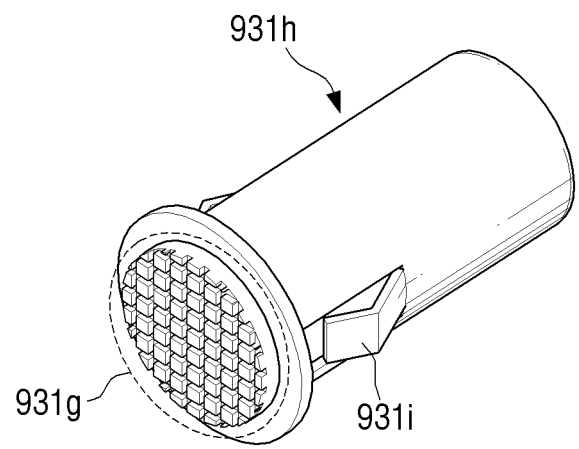

FIGS. 9A and 9B are perspective views illustrating a first light window according to one or more exemplary embodiments.

Referring to FIG. 9A, a first light window 931f has a surface-treated surface 931g. The surface 931g of the first light window 931f may be surface-treated for at least one of condensing the incident light onto a light incident surface of an optical fiber and diffusing the light outputting through the light incident surface of the optical fiber from a luminous component. For example, the surface treatment may include painting, irregularities, geometric patterns, convex embossing, or concave embossing.

The first light window 931f having the surface-treated surface 931g may condense light being incident with lower output from the remote controller onto the light incident surface of the optical fiber or may diffuse light being outputted through the light incident surface of the optical fiber more widely than the totally reflected light.

Referring to FIG. 9B, a first light window 931h may have locking protrusions 931i. The locking protrusions 931i may prevent the first light window 931h from being separated from an opening of a front frame and allow the first light window 931h to be fixed to the opening of the front frame.

If an exposed area of the first light window 931h is larger than the connection sectional area of the optical fiber, the first light window 931h may be inserted into the opening from a connection portion to be connected to the optical fiber through the front surface of the front frame. For example, the first light window 931h may be mounted or separated through the opening from the front surface of the front frame in the direction of the opening.

If the exposed area of the first light window 931h is substantially the same as the connection sectional area of the optical fiber (e.g., the difference between the two areas is less than or equal to ±5%), the first light window 931h may be inserted into the opening from an exposed portion of the first light window 931h through the rear surface of the front frame. For example, the first light window 931h may be mounted or separated through the opening from the rear surface of the front frame.

According to one or more exemplary embodiments, a display apparatus may include an optical component that is placed such that the optical component is out-of-line of sight from some or all incident electromagnetic transmissions. In an exemplary embodiment, the electromagnetic transmission emitted from an emitter would propagate in a direction and the optical component would not be disposed so that the optical component would receive the incident electromagnetic transmission in a direction that is along the direction of propagation of the electromagnetic transmission. In yet another exemplary embodiment, the electromagnetic transmission is output in a line of sight propagation direction from the emitter and the optical component does not receive the electromagnetic transmission directly from this line of sight propagation direction. Thus, in order to deliver the electromagnetic transmissions to the optical component, the display device may further include an optical path that is configured to guide the electromagnetic transmission to the optical component. Hence, the electromagnetic transmission is indirectly received by the optical component.

According to one or more exemplary embodiments, the optical path may have a single point of entry which allows for incident electromagnetic transmissions. The point of entry may include a lens, filter, prism, etc., or combination thereof. The point of entry may be larger than the remaining part of the optical path so that the point of entry can receive a larger sample of the incident electromagnetic transmission.

According to one or more exemplary embodiments, the optical path may include an optical channel that extends from the point of entry to an opening in the optical component. The optical channel may include one or more mirrors configured to guide the electromagnetic transmission to and from the optical component. Alternatively the optical channel may include one or any combination of lens, prisms, filters, optical fibers, mirrors, etc. which are configured to help guide the received electromagnetic transmission to and from the optical component.

Further, according to one or more exemplary embodiments, the optical component may include a plurality of sensors each designed to receive or transmit a signal that is provided by, or may be transmitted using, electromagnetic transmissions. For example, the optical component may include an infrared sensor and a camera sensor wherein the electromagnetic transmission carries both frequency signals which are routed and received by the sensors. Further, the sensors may reciprocate by transmitting a signal or there may be included another element within the optical component for this purpose that transmits an electromagnetic transmission out through the optical path. Further, the optical component may include more than one of the same type of sensor wherein each are configured to receive a signal that in encoded specifically for each, by using, for example, code division or time division signal propagation techniques.

While the embodiments of the present disclosure have been described, additional variations and modifications of the embodiments may occur to those skilled in the art once they learn of the basic inventive concepts. Therefore, it is intended that the appended claims shall be construed to include both the above embodiments and all such variations and modifications that fall within the spirit and scope of the inventive concepts.

What is claimed is:

1. A display apparatus comprising:
a front frame supporting a display panel of the display apparatus;
an optical component comprising a sensor and provided in the front frame; and
an optical fiber component configured to transmit electromagnetic transmission being incident on the front frame, to the sensor, the optical fiber component comprising:
a first light window configured to be exposed on the front frame and receive the electromagnetic transmission;
an optical fiber configured to transmit the electromagnetic transmission from the first light window to the sensor; and
a second light window configured to output the transmitted electromagnetic transmission from the optical fiber to the sensor, the second light window spaced apart from the sensor,
wherein the first light window is detachably attached to the optical fiber, and
wherein the first light window is configured to condense the electromagnetic transmission onto a light incident surface of the optical fiber, and the second light window is configured to diffuse the electromagnetic transmission toward the sensor.

2. The display apparatus of claim 1,
wherein the optical fiber is configured to connect the first light window and the second light window.

3. The display apparatus of claim 2, wherein the first light window is formed so that a connection sectional area to be connected to the optical fiber is smaller than an exposed area to be exposed at the front frame.

4. The display apparatus of claim 2,
wherein the first light window comprises locking protrusions, and
wherein the first light window is configured to be removably mounted through one of a front surface and a rear surface of the front frame by using the locking protrusions.

5. The display apparatus of claim 2, wherein the second light window is removably mounted to one of a top connection opening and a side connection opening of the optical component configured to house the sensor.

6. The display apparatus of claim 2, wherein the optical component comprises: a circuit board on which the sensor is mounted;
a housing surrounding the circuit board; and
a connection opening that is formed in a surface of the housing and accommodates the second light window.

7. The display apparatus of claim 6, further comprising:
a reflector that is formed within the housing such that the reflector faces the sensor and is configured to reflect the electromagnetic transmission from the second light window,
wherein the reflector comprises at least one of a reflective film, a reflective sheet, and a reflective paint.

8. The display apparatus of claim 6,
wherein the sensor is connected to a main board through the circuit board, and wherein the circuit board comprises at least one of micro controllers, condensers, resistors, and transistors.

9. The display apparatus of claim 6,
wherein the sensor comprises a plurality of sensors, and
wherein the plurality of sensors mounted on the circuit board are arranged in a perpendicular direction or in a horizontal direction based on a surface of the main board.

10. The display apparatus of claim 2, wherein the exposed first light window comprises a surface-treatment configured for at least one of light being incident onto the optical fiber and light outputted from the optical fiber.

11. The display apparatus of claim 1, wherein the sensor is provided on a main board, the main board disposed in the front frame, and
wherein the sensor is placed closer to one side of the main board away from a center point of the main board.

12. The display apparatus of claim 2, wherein the optical fiber comprises at least one of a single mode optical fiber and a multi mode optical fiber.

13. The display apparatus of claim 1, wherein the sensor comprises at least one of an electromagnetic transmission receiving component configured to detect infrared rays, a photoconductive component configured to detect brightness of the electromagnetic transmission, and a luminous component.

14. The display apparatus of claim 1,
wherein the optical component is out of line-of-sight of an emitter of the electromagnetic transmission.

15. The display apparatus of claim 1,
wherein the sensor is further configured to transmit an outbound electromagnetic transmission through the optical fiber component.

16. The display apparatus of claim 1,
wherein the optical fiber component further comprises a transmitter configured to transmit an outbound electromagnetic transmission through the optical fiber component.

17. The display apparatus of claim 1, wherein the electromagnetic transmission comprises an infrared ray.

18. A display apparatus comprising:
a first light window configured to be exposed on a front frame and on which light is incident;
an optical component disposed out of line-of-sight from the light incident on the front frame, the optical component comprising:
a sensor; and
a second light window configured to output the light that is incident through the first light window to the sensor, the second light window spaced apart from the sensor; and
an optical fiber connected to an end of the first light window; and an end of the second light window,
wherein at least one of an end of the first light window and an end of the second light window is detachably attached to the optical fiber, and
wherein the first light window is configured to condense the electromagnetic transmission onto a light incident surface of the optical fiber, and the second light window is configured to diffuse the electromagnetic transmission toward the sensor.

19. A display apparatus comprising:
a sensor cover that is disposed on a main board on which a sensor is mounted, and wherein the sensor cover is configured to surround the sensor; and an optical fiber component comprising:
a first light window configured to be exposed in a front frame,
a second light window configured to be connected to the sensor cover, and
an optical fiber connecting the first light window and the second light window,
wherein the optical fiber component receives light incident through the first light window and outputs the light through the second light window toward the sensor,
wherein the first light window is detachably attached to the optical fiber,
wherein the first light window is configured to condense the electromagnetic transmission onto a light incident surface of the optical fiber, and the second light window is configured to diffuse the electromagnetic transmission toward the sensor, and
wherein the sensor is offset from an outer circumference of the second end of the optical fiber in a radial direction of the optical fiber at the second end of the optical fiber.

20. A display apparatus comprising:
an optical component that is placed in a main board and comprises a sensor connected to the main board; and
an optical fiber unit comprising:
a first light window to be exposed in a front frame;
a second light window to be connected to the optical component, the second light window spaced apart from the sensor; and
an optical fiber connecting the first light window and the second light window,
wherein the optical fiber unit outputs light incident through the first light window toward the sensor through the second light window,
wherein the first light window is detachably attached to the optical fiber, and
wherein the first light window is configured to condense the electromagnetic transmission onto a light incident surface of the optical fiber, and the second light window is configured to diffuse the electromagnetic transmission toward the sensor.

21. A display apparatus comprising:
a display unit;
a front frame supporting the display unit;
a main board placed in a rear surface of the display unit;
an optical component that is placed in the main board and comprises a sensor electrically connected to the main board; and
an optical fiber unit comprising:
a first light window to be exposed in the front frame;
a second light window to be connected to the optical component, the second light window spaced apart from the sensor; and
an optical fiber connecting the first light window and the second light window,
wherein the optical fiber unit outputs light incident through the first light window toward the sensor through the second light window, and
wherein the first light window is detachably attached to the optical fiber, and
wherein the first light window is configured to condense the electromagnetic transmission onto a light incident surface of the optical fiber, and the second light window is configured to diffuse the electromagnetic transmission toward the sensor.

22. A display apparatus comprising:
an optical component that is out of line-of-sight of an emitter which is configured to emit an electromagnetic transmission; and
an optical path configured to guide the electromagnetic transmission toward the optical component,
wherein the optical component is a plurality of sensors configured to receive the electromagnetic transmission,
wherein the optical path comprises:
a first light window configured to be exposed on a front frame of the display apparatus and receive the electromagnetic transmission;
a second light window disposed to be spaced apart from the plurality of sensors; and
an optical fiber connecting the first light window and the second light window, and configured to transmit the electromagnetic transmission from the first light window to the optical component,
wherein the first light lens is detachably attached to the optical fiber,
wherein the first light window is configured to condense the electromagnetic transmission onto a light incident surface of the optical fiber, and the second light window is configured to diffuse the electromagnetic transmission toward the plurality of sensors, and
wherein at least one of the plurality of sensors is offset from an outer circumference of the second light window in a radial direction of the second light window.

23. The display apparatus of claim 22, wherein the optical component is a sensor configured to receive the electromagnetic transmission.

24. The display apparatus of claim 22, wherein the optical component is a plurality of sensors configured to receive the electromagnetic transmission.

25. The display apparatus of claim 24, wherein at least one of the plurality of sensors is further configured to transmit an outbound electromagnetic transmission through the optical path.

26. The display apparatus of claim 22, wherein the optical component is at least one sensor configured to receive the electromagnetic transmission and a transmitter configured to transmit an outbound electromagnetic transmission through the optical path.

27. The display apparatus of claim 22, further comprising a point of entry configured at a point along the optical path such that the point of entry may receive the electromagnetic transmission;
wherein the optical component adapter is configured to disperse the electromagnetic transmission at the optical component so that one or more sensors within the optical component can receive the electromagnetic transmission, and condense an outbound electromagnetic transmission.

28. The display apparatus of claim 22, further comprising:
wherein the electromagnetic transmission comprises an infrared ray.

29. A display apparatus comprising:
a bezel comprising a first signal adjuster configured to receive an electromagnetic transmission;
a sensor disposed adjacent to a second signal adjuster that is out of line-of-sight of an emitter of the electromagnetic transmission; and
a fiber optic cable connected, at a first end, to the first signal adjuster and connected, at a second end, to the second signal adjuster and configured to transmit the electromagnetic transmission, wherein at least one of an end of the first signal adjuster and an end of the second signal adjuster is detachably attached to the fiber optic cable, and wherein the first signal adjuster is configured to condense the electromagnetic transmission onto a light incident surface of the fiber optic cable, and the second signal adjuster is configured to diffuse the electromagnetic transmission toward the sensor.

30. The display apparatus of claim 29, wherein the first signal adjuster is larger in cross section than the fiber optic cable, and wherein the first signal adjuster is configured to condense the electromagnetic transmission to propagate on the fiber optic cable.

31. The display apparatus of claim 29, wherein the second signal adjuster is larger in cross section than the fiber optic cable, and wherein the second signal adjuster is configured to diffuse the electromagnetic transmission toward the sensor.

32. The display apparatus of claim 29, wherein the second signal adjuster is configured to condense an outbound electromagnetic transmission originating from the sensor;

wherein the first signal adjuster is configured to diffuse the outbound electromagnetic transmission as it propagates out of the display apparatus.

33. The display apparatus of claim 29, wherein the electromagnetic transmission comprises an infrared ray.

* * * * *